Mar. 6, 1923.
C. R. BRINK
1,447,339
SELF-ADJUSTING BEARING
Filed June 30, 1921
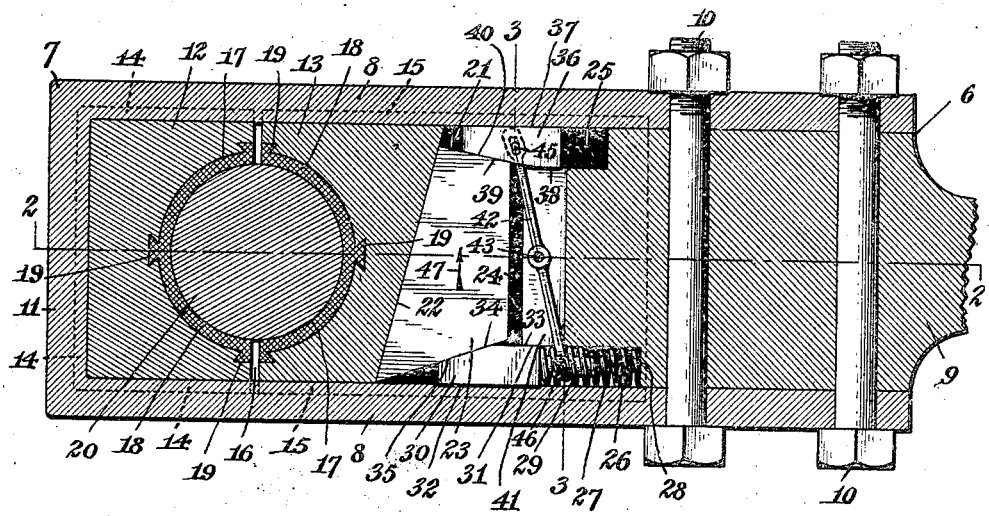
Fig. 1.
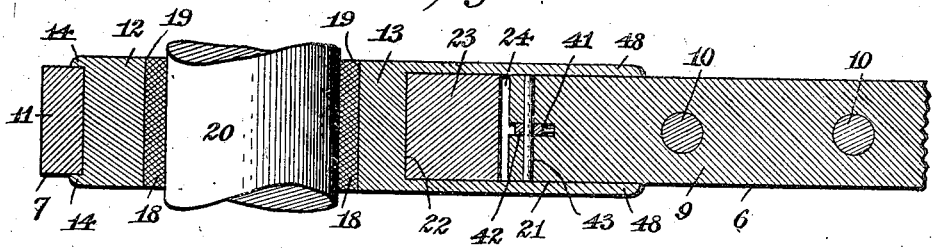
Fig. 2.
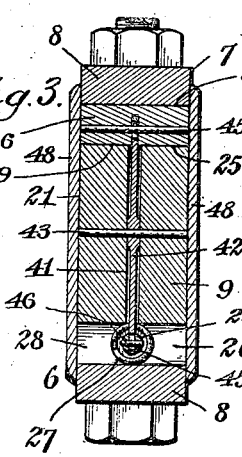
Fig. 3.
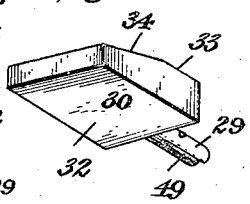
Fig. 4.
Fig. 5.
Inventor:
Charles R. Brink.
By Emil Kuchar
Attorney
Witness:
J. J. Oberst.

Patented Mar. 6, 1923.

1,447,339

UNITED STATES PATENT OFFICE.

CHARLES R. BRINK, OF BUFFALO, NEW YORK, ASSIGNOR OF ONE-HALF TO LEWIS DELTEN BRINK, OF HORNELL, NEW YORK.

SELF-ADJUSTING BEARING.

Application filed June 30, 1921. Serial No. 481,528.

*To all whom it may concern:*

Be it known that I, CHARLES R. BRINK, a citizen of the United States, residing at Buffalo, in the county of Erie and State of New York, have invented certain new and useful Improvements in Self-Adjusting Bearings, of which the following is a specification.

My invention relates to self-adjusting bearings for journals, cranks, axles, etc., and it has for its primary object the provision of a simple and effective bearing of this type which will automatically take up and retain the bearing members in proper contact with the journals, crank or axle, as the case may be.

A further object is to provide a bearing of this kind with a take-up wedge, and means for automatically releasing one end of said wedge and forcing said wedge into binding position from the other end thereof.

A still further object of my invention is to provide a device of this kind which is simple, inexpensive and highly efficient in the performance of its functions.

With these and other objects in view to be hereinafter pointed out, my invention consists in the novel features of construction and in the arrangement and combination of parts to be hereinafter described and more particularly pointed out in the subjoined claims.

In the drawings:—

Fig. 1 is a sectional elevation of my invention applied to a connecting rod and adapted for co-action with bearing members within said rod arranged around a crank.

Fig. 2 is a longitudinal section taken on line 2—2, Fig. 1.

Fig. 3 is a cross section taken on line 3—3, Fig. 1.

Fig. 4 is a detached perspective view of what I term a presser wedge.

Fig. 5 is a detached perspective view of a combined stop and release wedge.

With similar numerals designating corresponding parts in the several figures, 6 designates a connecting rod having a U-shaped strap 7 secured to its outer end. The ends of the parallel side members 8 of said strap lie against opposite edges of the intermediate or body portion 9 of the connecting rod and are fastened thereto by means of bolts 10, thus forming an open space between the end of said body portion and the cross member 11 of said strap. In said space two bearing members 12, 13 are arranged, one a member retained in fixed position in said space and the other a member slidable in said space, said bearing members being somewhat wider than the strap 7 and having flanges 14, 15, respectively, overlying the edges of said straps, as best shown by dotted lines in Fig. 1. The bearing members 12 and 13 are normally spaced apart slightly, as at 16, and in their opposing edges, semi-circular cavities 17 are formed, which are faced with babbitt or other suitable material 18 fastened thereto by running the metal into dovetailed grooves 19 extending from one side to the other of said members. The semi-circular grooves so formed and faced provide a circular or substantially circular bearing for a crank 20 or similar mechanical element.

The edges of the fixed bearing member 12 conform to and lie in contact with the inner sides of the side members 8 and cross member 11 of the strap 7, while the slidable bearing member 13 has opposite edges in contact with the inner sides of the said side members 8 and its inner edge deeply grooved, as at 21, with the inner wall 22 of the groove arranged obliquely.

Extending into the groove 21 is a take-up wedge 23, a portion of which extends outwardly from said groove and is normally spaced from the end of the body portion 9 of the connecting rod, as at 24.

The body portion of the connecting rod has opposite edges notched, as at 25, 26, the notch 26 being somewhat longer than the notch 25 and having a spiral spring 27 situated therein, one end of said spring bearing against the inner wall 28 of said notch 26 and the other end surrounding a pin 29 extending from what I term a presser wedge 30 guided for movement between the longitudinal wall 31 of said notch and the adjacent side member 8 of the strap. Said presser wedge has its outer side 32 in contact with the inner face of said side member and a portion of its inner side parallel with said outer side, as at 33; the remaining portion of said inner side being beveled, as at 34, to form the wedge, said beveled portion being in contact with the adjacent end of the take-up wedge 23, which is correspondingly beveled, as at 35. While one end of the spiral spring 27 bears against the inner wall 28 of the notch 26, as stated, the other end thereof bears against the inner end of the presser wedge, thus tending to force and maintain said presser wedge in contact with the beveled end 35 of the take-up wedge.

In the notch 25, a combined abutment and release wedge 36 is arranged, said combined abutment and release wedge having a flat outer side 37 in contact with the inner side of the other side member 8 and having a portion of its inner side parallel with its outer side, as at 38, and the remaining portion of its inner side beveled, as at 39, to form the wedge; said beveled face 39 being the reverse of the beveled face 34 of the presser wedge and being in contact with the adjacent end of the take-up wedge, which is correspondingly beveled, as at 40.

The presser wedge and combined abutment and release wedge are adapted to work in opposition; that is to say, when one wedge moves outwardly, the other is adapted to move inwardly, and to accomplish this the inner end of the body portion 9 of the connecting rod is grooved transversely, as at 41, the groove extending from the notch 25 at one edge of said body portion to the notch 26 at the other edge thereof, and arranged to extend through said groove 41 is a lever 42, which is pivotally secured midway between its ends within said groove by a pivot pin 43, opposite ends of said lever extending outwardly beyond the ends of the groove 41, one end thereof being entered in a notch or slot 44 formed in the combined abutment and release wedge and being fastened therein by means of a pin 45 extending through said wedge and the other end being entered in a slot or opening 49 formed in the pin 29 of the presser wedge and being fastened in said pin by means of a pivot pin 46.

With the parts in normal positions, the bearing members are slightly spaced apart, and as the bearing surfaces of said members become worn, the spring 27 forces the presser member or wedge outwardly and as such movement, although very slight, will cause the lever 42 to swing on its pivot pin 43, the combined abutment and release wedge or member 36 will move inwardly to a compensating degree, thus permitting movement of the take-up wedge in the direction of the arrow 47 in Fig. 1, which forces the slidable or movable bearing member 13 toward the fixed bearing member 12 and at all times keeps a proper working fit between the two members and the crank, journal, or axle, as the case may be.

Normally the parts are so fitted that both the presser wedge and the combined abutment and release wedge are held tightly against opposite ends of the take-up wedge and therefore the combined abutment and release wedge—so termed owing to the fact that it serves as an abutment for the take-up wedge and when moved inwardly also releases said take-up wedge—acts as an abutment to prevent movement of the take-up wedge regardless of the pressure exerted against the opposite end of said take-up wedge. The presser wedge and the combined abutment and release wedge are at all times in firm contact with the take-up wedge and the take-up wedge in firm contact with the beveled inner wall 22 of the groove 21 in the inner bearing member, such parts of the device will at all times be maintained firmly in physical contact, one with another, thus avoiding hammering and all objectionable noises during operation.

It is to be noted that the groove 21 formed in the inner end of the inner bearing member 13 is comparatively deep and that the walls 48 of said groove extend inwardly along opposite sides of the device a considerable distance. Said walls therefore extend onto the body portion of the connecting rod and cover the three wedges and also the notches 25, 26 formed in said body portion. The space between the inner edge of the take-up wedge and the outer end of the body portion 9 of the connecting rod permits said take-up wedge to move laterally and inwardly when taking up wear between the bearing members.

Obviously, when my invention is applied to a bearing other than the bearing of a connecting rod, the bearing members will be guided in any suitable manner and the wedges arranged for movement in a fixed part of the bearing similar to that shown in the drawings.

Having thus described my invention, what I claim is:—

1. In a device of the character described, a bearing comprising two members spaced apart, one of said members serving as a fixed bearing member, a second bearing member guided for rectilinear movement toward and from the first-mentioned bearing member, a take-up wedge acting against said second bearing member, a presser member and a release member in contact with opposite ends of said take-up member, said presser and release members being operatively connected to work in opposition and permit movement of said take-up member.

2. In a device of the character described, two members spaced apart, one of said members serving as a fixed bearing member, a second bearing member, a member journaled between said bearing members, a wedge member acting against said second bearing member, an abutment member against which one end of said wedge member bears, a spring-forced presser member at the other end of said wedge member, and operative connection between said abutment member and presser member to move the two in opposite directions.

3. In a journal bearing, a fixed bearing member, a movable bearing member co-acting with said fixed bearing member, and wedge members movable at an angle to each other, one of said wedge members being a take-up member in contact with said movable bearing member and the other being spring-pressed and acting against said take-up member.

4. In a journal bearing, a fixed bearing member, a movable bearing member co-acting with said fixed bearing member, a journal between said bearing members, and three co-acting wedge members, one of said wedge members being a take-up member movable at right angles to the other wedge members and one of said other wedge members being spring-pressed against one end of said take-up member and the other being held in contact with the other end of said take-up member.

5. A journal bearing comprising a fixed bearing member, a movable bearing member, a journal between said bearing members, a transversely movable wedge acting to force and maintain said movable bearing firmly against said journal and having beveled ends, a combined abutment and release wedge bearing against one of the beveled ends of said take-up wedge, a presser wedge spring-pressed against the other beveled end of said transversely movable wedge, and means for moving said abutment and release wedge in one direction when said presser wedge is moved in the other direction.

6. In a journal bearing, two spaced members, one of said members being a fixed bearing member, a second bearing member movable toward said first-mentioned bearing member, said second bearing member having an oblique face thereon, a journal between said bearing members, a transversely movable take-up wedge bearing against said oblique face and having beveled ends, a presser wedge bearing against one beveled end of said take-up member and movable at right angles thereto, a release wedge against which the other beveled end of said take-up members bears, and means co-acting with said presser wedge and release wedge to cause automatic movement of the two in opposite directions so as to give said take-up wedge a tight running fit with said journal at all times.

7. In a device of the kind described, a connecting rod having an opening therein, a fixed bearing member, a second bearing member within said opening having an oblique contact face, a journal between said bearing members, a take-up wedge bearing against the oblique face of said second bearing member, a presser wedge bearing against one end of said take-up wedge, a spring bearing against said presser wedge, a release wedge in contact with the other end of said take-up wedge, and a lever pivotally secured between its ends and having opposite ends connected to said presser wedge and said release wedge.

8. A device of the character described, comprising a connecting rod having a body portion and a strap secured to said body portion forming a bearing-receiving opening, a fixed bearing member in said opening, a movable bearing member in said opening and having an oblique face at its inner edge, a journal between said bearing members, a take-up wedge in contact with the oblique face of said movable bearing member and adapted for movement transversely, said take-up wedge having opposite ends beveled, a take-up wedge in said opening bearing against one of the beveled ends of said take-up wedge, a spring pressing and maintaining said presser wedge in contact with said take-up wedge, a release wedge in said opening in contact with the opposite beveled end of said take-up wedge, and a lever pivotally secured between its ends and having opposite ends pivotally connected to said presser and release wedges whereby the release wedge is moved in one direction when said presser wedge is moved in the opposite direction by said spring.

9. A device of the character described, comprising a connecting rod having a body portion provided with notches at opposite longitudinal edges at one end thereof and a transverse groove opening into said notches, a U-shaped strap having the free ends of opposite side members secured to said body portion and having its transverse member spaced from the end of said body portion, a fixed bearing member in said U-shaped strap bearing against said transverse member and having its inner face provided with a semi-circular groove, a movable bearing member slidable in said U-shaped strap and having its outer edge provided with a semi-circular groove and its inner edge provided with an oblique face, a journal fitting within the semi-circular grooves of said bearing members, a transversely-disposed take-up wedge bearing against the oblique inner face of said movable bearing member, a presser wedge extending into one of the notches of said body portion and bearing against one end of said take-up wedge, a combined abutment and release wedge within the other notch of said body portion, a spring acting against said presser wedge, and a lever extending through the groove of said body portion and pivoted centrally between its ends therein, one end of said lever being pivotally connected to said combined abutment and release wedge and the other being pivotally connected to said presser wedge.

10. In a take-up device for bearings, a transversely movable take-up wedge adapted to act against one of two members of the bearings, longitudinally-movable wedges bearing against opposite ends of said take-up wedge to respectively move and permit movement of said take-up wedge, and operative connection between said longitudinally movable wedges to release one of said longitudinally movable wedges from said take-up wedge when the latter is being moved transversely by the other.

In testimony whereof I affix my signature.

CHARLES R. BRINK.